Nov. 14, 1950
C. O. BAKER
2,530,143
RECOVERY AND UTILIZATION OF OLEFINS BY
AN ABSORPTION-ALKYLATION PROCESS
Filed Sept. 27, 1945
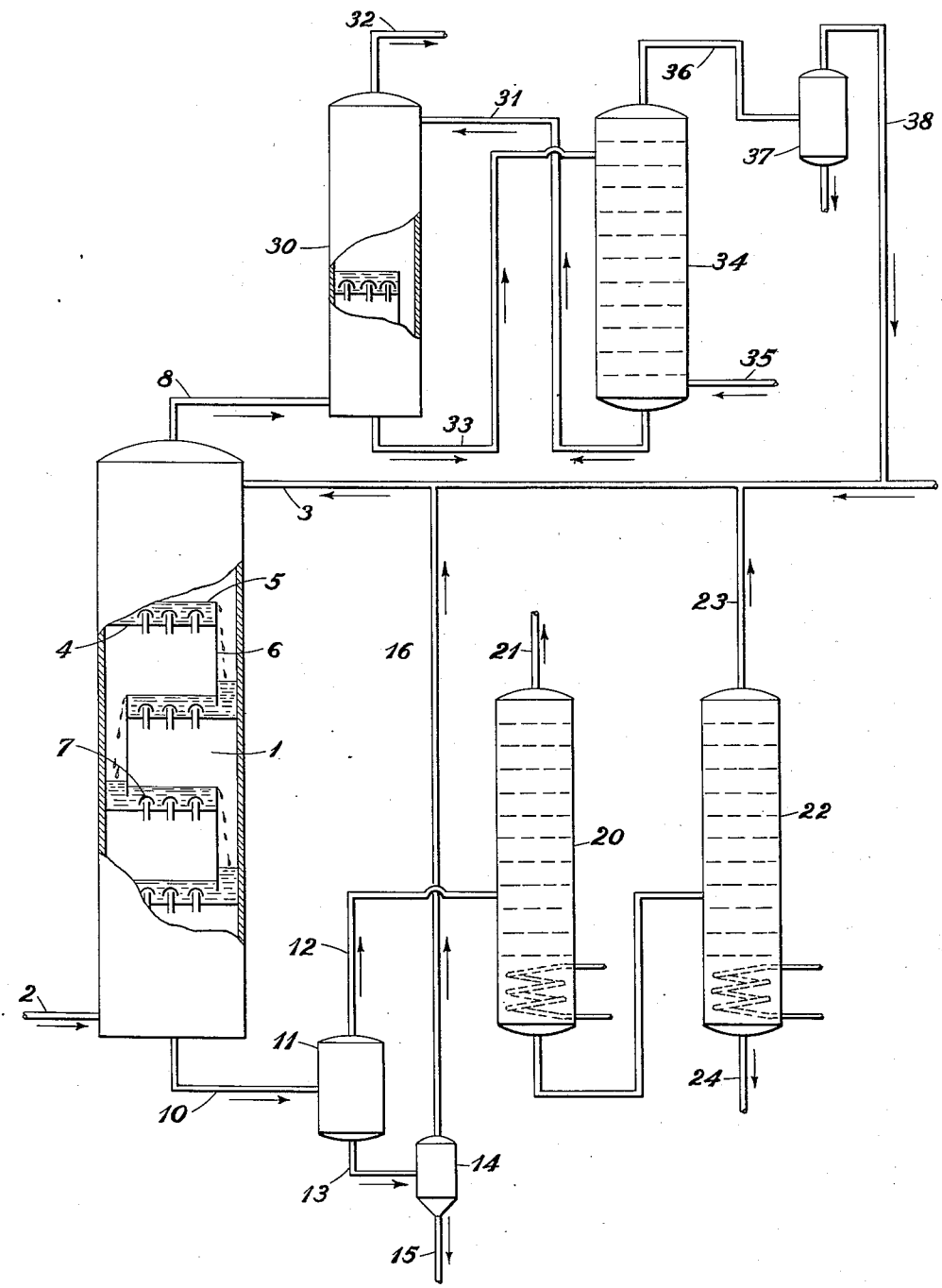
Charles Ovid Baker
INVENTOR
BY Sidney A. Johnson
ATTORNEY Patented Nov. 14, 1950

2,530,143

UNITED STATES PATENT OFFICE 2,530,143

RECOVERY AND UTILIZATION OF OLEFINS BY AN ABSORPTION-ALKYLATION PROCESS

Charles Ovid Baker, Dallas, Tex., assignor, by mesne assignments, to Socony-Vacuum Oil Company, Incorporated, New York, N. Y., a corporation of New York Application September 27, 1945, Serial No. 618,972

4 Claims. (Cl. 260—683.4)

1

This invention relates to an improved process for effecting the alkylation of light olefins. More particularly the invention relates to the economical recovery and utilization of the light olefins contained in dilute $C_3$ and lighter hydrocarbon gas streams for the production of high octane motor fuel.

Processes for the alkylation of light olefins, particularly ethylene and propylene are well known, but have not been adopted extensively commercially primarily because of the difficulty of concentrating these olefins. Ethylene and propylene are available in large quantities in refinery gases from cracking units, and are also fairly readily obtainable by the cracking of propane or a mixed ethane-propane gas stream. From all of these sources, however, the concentration of the olefin is relatively low, generally considerably less than 50% on a mol or volume basis. The separation and concentration of these olefins for use in conventional alkylation reactors requires expensive, low temperature fractionation equipment. Absorption has been proposed, but this also involves an additional processing step, and is effective in removing only methane and hydrogen, although these represent the main objectionable diluents.

In accordance with my invention, the alkylation of an isoparaffin, such as isobutane, with the light olefins contained in dilute gas streams is combined with the absorption of the light olefins from the gas stream. The combined alkylation-absorption step is effected by employing the isoparaffin to be alkylated as the absorbent menstruum and by the use of a soluble catalyst, dissolved in the isoparaffin liquid stream in the absorber. The catalyst employed should be soluble in the isoparaffin in effective concentration at the conditions prevailing in the absorber, and any degradation products of the catalyst should be of a fluid or soluble nature so that they will be carried out of the absorption reactor with the rich absorption menstruum-alkylate mixture. Aluminum bromide is a suitable catalyst, having considerable solubility in light paraffin hydrocarbons at normal and moderately elevated temperatures. Additionally the hydrocarbon complex tar that is slowly formed by side reactions in the alkylation step is of a light fluid nature and will be largely carried out of the absorption-reactor with the liquid effluent from which it may be removed by gravity settling for recovery and regeneration.

The process of my invention may be carried out in any of the conventional types of absorption apparatus, although an absorber of the bubble plate type is preferred because of the more uniform and controllable contacting of the gas and liquid phases. By suitable control of the contact time between the absorbed olefin and the isoparaffin-catalyst solution, the alkylation reaction may be substantially complete by the time that the liquid stream is discharged from the reactor. Where the reaction is not complete, a small conventional reaction vessel may be employed to effect the necessary additional contacting of the olefin dissolved in the original isoparaffin-alkylate mixture.

Inasmuch as the olefin absorbed in the isoparaffin lean oil is continuously being removed by reaction with the isoparaffin induced by the presence of the aluminum bromide catalyst, the absorption is much more efficient than would otherwise be obtained. This is particularly true of the propylene, which is readily reactive, but may also be obtained with the ethylene present by suitably adjusting the size of the absorber, and hence the liquid residence time, with the operating temperature to obtain substantially complete disappearance of the absorbed olefins through reaction to alkylate.

My invention may be best understood by reference to the drawing wherein the essential steps in the mode of operation thereof are diagrammatically illustrated. A gas stream containing ethylene and propylene in admixture with light paraffins as methane, ethane, and propane, and hydrogen is introduced into the base of bubble plate absorber 1 through line 2. An isobutane solution of aluminum bromide, containing minor amounts of alkylate product and heavier saturated hydrocarbons obtained in a manner hereinafter described is introduced into the top of the absorber through line 3. The temperature in the column is maintained at a level at which the alkylation of the olefin will proceed at a satisfactory rate for the concentration of catalyst employed. The pressure should be sufficient to maintain the isobutane in the liquid phase. Suitable conditions are a temperature of 100° F. and a pressure of 285 pounds per square inch gage, at a concentration of aluminum bromide of 5 weight per cent in the lean, isobutane absorption menstruum. A liquid residence time of from 15 to 30 minutes, and a gas residence time from 1 to 7 minutes is satisfactory under the conditions mentioned, although with the shorter value of time some unreacted ethylene will generally be present in both the rich, isobutane-alkylate liquid effluent and in the lean gas effluent from the absorber. The temperature, contact time, and catalyst concentration should be adjusted to attain the desired extent of olefin removal from the lean gas without excessive catalyst consumption.

The lean isobutane solution collects upon the successive plates 4 in the column to a level 5 and flows through the respective downcomers 6 to the next succeeding plate. The ascending gas rises through the bubble caps 7 which are regularly spaced on each of the plates in the usual manner, and then passes successively through the liquid on each of the plates in the absorber. In passing through the isobutane-catalyst solution the olefins and the higher molecular weight paraffins are absorbed. Since the olefins are consumed by reaction the solution is relatively much leaner with respect to the olefins and their removal is more nearly complete. The overhead lean gas from the absorber, through line 8, contains substantially all the methane and hydrogen charged together with substantial portions of the ethane and propane charged.

The rich liquid effluent from the absorber in line 10 will contain excess isobutane absorbent, isobutane-ethylene alkylate, isobutane-propylene alkylate, some absorbed but unreacted ethylene, traces of propylene, and some propane, ethane, and methane. This effluent in line 10 is then sent to a flash evaporator 11 where the light gases and most of the isobutane and alkylate are taken off overhead through line 12. The bottoms from the evaporator in line 13 consisting of a concentrated solution of the aluminum bromide catalyst in the unvaporized isobutane-alkylate liquid, and aluminum bromide tar formed in the absorber and evaporator are sent to gravity settler 14. Tar is removed through line 15, and the aluminum bromide concentrate solution is returned via line 16 for admixture with more isobutane and for recycle to the absorber. The relatively small amount of alkylate products recycled to the absorber with this catalyst solution has no material effect on the absorption and alkylation reactions occurring in the absorber.

The overhead from the evaporator in line 12 is then sent to a suitable fractionating column 20 for separation of the light gases which are discharged through line 21. The isobutane is separated from the alkylate product in fractionator 22 and recycled to line 3 via line 23. The alkylate product is drawn off from the deisobutanizer through line 24 for final stabilization and treatment.

The overhead gases from the absorber in line 8 will contain an appreciable portion of the light isoparaffin absorption menstruum. This gas stream is then sent to a second absorption tower 30 wherein the gas is contacted with a conventional light absorption oil having an average molecular weight considerably in excess of that of the isoparaffin, say from 160 to 240, introduced through 31. The stripped gas overhead from tower 30 in line 32 is suitable for use as a fuel gas. The rich absorption oil bottoms in line 33 are then sent to a stripping column 34 wherein the absorbed isoparaffin is stripped from the absorption oil by steam introduced through line 35. The steam-isoparaffin overhead in line 36 is condensed and sent to separator 37. The recovered isobutane is then recycled to the olefin absorber 1 via lines 38 and 3. Make-up isobutane to replace that consumed in alkylation or lost from the system is introduced through line 3 together with necessary make-up aluminum bromide in solution to keep the catalyst concentration in solution at the desired level.

The particular operating conditions for the absorber-reactor 1 may be varied over a fairly broad range from those given in connection with the description of the flow sheet. Temperatures of from about 65° F. to about 200° F. are satisfactory. Higher temperatures require excessive pressures and result in excessive isoparaffin loss although theoretically temperatures up to the critical temperature of the isoparaffin might be employed. Pressures of from 50 to 600 or 700 pounds per square inch gage or even higher may be employed. Over the temperature range of from 65° F. to 200° F., catalyst concentrations of from about 0.1 to about 4.0 mol per cent should be employed, although with gas containing much propylene where temperatures below 80° F. are used the catalyst concentration is preferably above 0.2 mol per cent. Also with temperatures above 150° F. or with feed stocks containing little or no ethylene, catalyst concentrations not exceeding 1.0 or 1.5 mol per cent are preferred to avoid excessive catalyst loss and cracking of the alkylate products. Temperatures of from 80° to 150° F. are preferred for efficient absorption and reaction.

The rate of lean oil circulation to gas circulation through the absorber should be sufficient so that at least two mols of isoparaffin enter the top of the absorber per mol of olefin introduced into the base of the absorber. This is to ensure a ratio of at least one mol of isoparaffin per mol of alkylate at the point of initial contact with the olefin rich gas. Within this restriction the rates of oil to gas circulation are dictated by the requirements of efficient and economical absorption at the operating conditions used.

The process is adapted for use with gas streams containing from a few per cent of olefin up to as high as 50 or 60 per cent and is of utility for a light olefin stream contaminated with considerable proportions of methane or hydrogen or both. In addition to the treatment of dilute ethylene-propylene streams, the process may also be employed for the treatment of dilute streams of either olefin individually.

Pure isoparaffin streams or a single pure isoparaffin need not necessarily be employed as the lean oil. A stream of isobutane may be employed, or a stream of isopentane, or a stream of mixed isobutane-isopentane would be satisfactory. Normal paraffins may also be present, although, if present, provision should be made to remove these normal paraffins in the fractionation system as rapidly as they are introduced in the make-up lean oil to prevent a building-up of these components in the absorption-reaction system. Small amounts of heavier paraffins, i. e. $C_6$ plus paraffins or isoparaffins may also be present and have the advantage of raising the average molecular weight of the absorption oil, reducing its volatilization. Alkylate product introduced with the recycle catalyst stream is one source of such heavier hydrocarbon introduction. Since these heavier hydrocarbons would tend to undergo competing reactions with the olefin in the presence of the catalyst, however, their concentration should be low, less than 20 mol per cent, preferably less than 10 mol per cent; and in all cases less than one-half the molar quantity of isoparaffin, preferably considerably less.

Inasmuch as considerable heat is evolved by the alkylation reaction suitable means should be provided to take away this heat of reaction. Intercoolers may be provided on the plates, in the downcomers, or a portion of the liquid in the downcomers may be withdrawn and circulated through an external cooler before return to the column.

In order to provide for most efficient absorption of the olefin and thus to minimize the number of bubble trays required or the operating pressure or both, it is desirable to have the major portion of the olefin absorbed on each individual tray reacted before reintroducing the isoparaffin absorption menstruum to the next succeeding tray. A relatively large amount of liquid holdup between trays is desirable to ensure adequate time for this desired olefin disappearance. The downcomers in the absorption column are therefore preferably substantially larger than those conventionally employed. Within the preferred temperature and catalyst concentration ranges the volume of liquid holdup in the downcomers should be sufficient to give a liquid residence time therein of at least five seconds, during which time most of the absorbed propylene will be reacted and a substantial portion of the ethylene.

In order to illustrate the increase in the selectivity of extraction obtained by the use of the process of my invention over conventional absorption the following tables show the results obtained by carrying out the absorption treatment of a $C_3$ and lighter gas stream with an isoparaffin absorption oil with the results obtained by employing 0.4 mol per cent of aluminum bromide in the isobutane absorption oil to give combined absorption-alkylation.

*Table I—Gas stream*

| Component | Rich Gas | Lean Gas (Absorption Only) | Lean Gas (Absorption-Alkylation) |
|---|---|---|---|
| | *Mols* | *Mols* | *Mols* |
| Hydrogen | 130 | 130 | 130 |
| Methane | 250 | 236 | 236 |
| Ethylene | 60 | 47 | 6 |
| Ethane | 110 | 77 | 77 |
| Propylene | 120 | 43 | 1 |
| Propane | 330 | 103 | 103 |
| Isobutane | 0 | 187 | 187 |

*Table II—Oil stream*

| Component | Lean Oil | Rich Oil (Absorption Only) | Rich Oil (Absorption-Alkylation) |
|---|---|---|---|
| | *Mols* | *Mols* | *Mols* |
| Methane | 0 | 14 | 14 |
| Ethylene | 0 | 13 | 2 |
| Ethane | 0 | 33 | 33 |
| Propylene | 0 | 77 | 0 |
| Propane | 0 | 227 | 227 |
| Isobutane | 500 | 313 | 142 |
| Ethylene-Alkylate | 0 | 0 | 52 |
| Propylene-Alkylate | 0 | 0 | 119 |

From the above tables it is apparent that an increase in the ethylene removal from 21.5% to 90%, and an increase in the propylene removal from 64% to 99% was obtained by the addition of the catalyst. The substantial proportion of isobutane in the lean gas indicates the desirability of recovery of this constituent if the process is to be economically feasible.

The flow sheet and description thereof and the results reported in the tables above are to be considered as illustrative of my invention. Many variations in the design and operation of the process, the product recovery system, and the feed stock treated will be readily apparent to those skilled in the art. The invention should not be construed as limited except as indicated in the appended claims.

I claim:

1. The process for the recovery and utilization of light normally gaseous olefins from gaseous streams of $C_3$ and lighter hydrocarbons containing substantial proportions of such olefins in admixture with substantial proportions of light normally gaseous paraffins which comprises introducing a homogeneous, single phase solution of an isoparaffin of the class consisting of $C_4$ and $C_5$ isoparaffins having dissolved therein from 0.1 to 4.0 mol percent of aluminum bromide into the upper portion of an absorption column, introducing the gaseous stream into the lower portion of the absorption column for countercurrent contacting with the liquid isoparaffin, regulating the rate of introduction of the gaseous stream so that at least 2 mols of isoparaffin are introduced into the column per mol of olefin introduced, maintaining a temperature at which alkylation of the olefins with the isoparaffin will occur, maintaining a pressure sufficient to substantially retain the isoparaffin in the liquid phase at the operating temperature but below that at which substantial condensation of $C_3$ paraffins will occur, withdrawing the gaseous overhead from the absorption column, recovering the liquid effluent from the bottom of said absorption column consisting essentially of said aluminum bromide in solution in alkylate product and isoparaffin containing absorbed $C_3$ and lighter paraffins and any unreacted $C_3$ and lighted olefin, recovering the alkylate product, recycling the dissolved aluminum bromide in solution in isoparaffin to the absorption column, passing the gaseous overhead through a second absorption column countercurrent to an essentially paraffin hydrocarbon oil having an average molecular weight considerably in excess of that of the isoparaffin, stripping the absorbed isoparaffin from the rich absorption oil effluent from the second absorption column, and recycling the stripped isoparaffin to the first absorption column.

2. The process for the recovery and utilization of light normally gaseous olefins from gaseous streams of $C_3$ and lighter hydrocarbons containing substantial proportions of such olefins in admixture with substantial proportions of light normally gaseous paraffins which comprises introducing a homogeneous, single phase solution comprising isobutane having dissolved therein from 0.1 to 4.0 mol per cent of aluminum bromide into the upper portion of an absorption column, introducing the gaseous stream into the lower portion of the absorption column for countercurrent contacting with the liquid isobutane, regulating the rate of introduction of the gaseous stream so that at least 2 mols of isobutane are introduced into the column per mol of olefin introduced, maintaining a temperature at which alkylation of the olefins with the isobutane will occur, maintaining a pressure sufficient to substantially retain the isobutane in the liquid phase at the operating temperature but below that at which substantial condensation of $C_3$ paraffins will occur, withdrawing the gaseous overhead from the absorption column, recovering the liquid effluent from the bottom of said absorption column consisting essentially of said aluminum bromide in solution in alkylate product and isobutane containing absorbed $C_3$ and lighter paraffins and any unreacted $C_3$ and lighter olefin, recovering the alkylate product, recycling the dissolved aluminum bromide in solution in isobutane to the absorption column, passing the gaseous overhead through a second absorption column countercurrently to an essentially paraffin hydrocarbon oil having an average molecular weight considerably in excess of that of isobutane, stripping the absorbed isobutane from the rich liquid absorption oil effluent from the second absorption column, and recycling the stripped isobutane to the first absorption column.

3. The process for the recovery and utilization of light normally gaseous olefins from gaseous streams of $C_3$ and lighter hydrocarbons containing substantial proportions of such olefins in admixture with substantial proportions of light normally gaseous paraffins which comprises introducing a homogeneous, single phase solution of from 0.2 to 2.0 mol per cent of aluminum bromide in isobutane into the upper portion of an absorption column provided with a plurality of bubble trays, introducing the gaseous stream into the lower portion of the absorption column for countercurrent contacting with the liquid isobutane, regulating the rate of the introduction of the gaseous stream so that the molar quantity of isobutane introduced into the column is at least double the quantity of olefin introduced, maintaining a temperature between 80° F. and 150° F., maintaining a pressure sufficient to substantially retain the isobutane in the liquid phase at the operating temperature but below that at which substantial condensation of $C_3$ paraffins will occur, withdrawing the gaseous overhead from the absorption column, recovering the liquid effluent from the bottom of said absorption column consisting essentially of said aluminum bromide in solution in alkylate product and isobutane containing absorbed $C_3$ and lighter paraffins and any unreacted $C_3$ and lighter olefin, recovering the alkylate product, recycling the dissolved aluminum bromide in solution in isobutane to the absorption column, passing the gaseous overhead through a second absorption column countercurrently to an essentially paraffin hydrocarbon oil having an average molecular weight considerably in excess of that of isobutane, stripping the absorbed isobutane from the rich liquid absorption oil effluent from the second absorption column, and recycling the stripped isobutane to the first absorption column.

4. The process for the recovery and utilization of light normally gaseous olefins from gaseous streams of $C_3$ and lighter hydrocarbons containing substantial proportions of such olefins in admixture with substantial proportions of light normally gaseous paraffins which comprises introducing a homogeneous, single phase solution of from 0.2 to 2.0 mol per cent of aluminum bromide in isobutane into the upper portion of an absorption column provided with a plurality of bubble trays and having liquid downcomers provided for the flow of liquid isobutane to the successive trays in the column, introducing the gaseous stream into the lower portion of the column for contacting with and absorption in the liquid isobutane on the successive trays as the gas stream ascends through the column, regulating the rate of liquid feed to the column so that a residence time of at least five seconds is provided for the liquid in the respective downcomers whereby a substantial proportion of the absorbed olefins will be removed by reaction between successive trays, regulating the rate of the introduction of the gaseous stream so that the molar quantity of isobutane introduced into the column is at least double the quantity of olefin introduced, maintaining a temperature between 80° F. and 150° F., maintaining a pressure sufficient to substantially retain the isobutane in the liquid phase at the operating temperature but below that at which substantial condensation of $C_3$ paraffins will occur, withdrawing the gaseous overhead from the absorption column, recovering the liquid effluent from the bottom of said absorption column consisting essentially of said aluminum bromide in solution in alkylate product and isobutane containing absorbed $C_3$ and lighter paraffins and any unreacted $C_3$ and lighter olefin, recovering the alkylate product, recycling the dissolved aluminum bromide in solution in isobutane to the absorption column, passing the gaseous overhead through a second absorption column countercurrently to an essentially paraffin hydrocarbon oil having an average molecular weight considerably in excess of that of isobutane, stripping the absorbed isobutane from the rich liquid absorption oil effluent from the second absorption column, and recycling the stripped isobutane to the first absorption column.

CHARLES OVID BAKER.

REFERENCES CITED

The following references are of record in the file of this patent:

UNITED STATES PATENTS

| Number | Name | Date |
|---|---|---|
| 2,198,595 | Amos et al. | Apr. 30, 1940 |
| 2,286,504 | Parker | June 16, 1942 |
| 2,342,364 | Parker | Feb. 22, 1944 |
| 2,378,040 | Schulze | June 12, 1945 |
| 2,394,368 | Clarke | Feb. 5, 1946 |
| 2,401,925 | Gorin | June 11, 1946 |